United States Patent [19]

Bengtsson et al.

[11] 4,220,672

[45] Sep. 2, 1980

[54] PREPARATION OF DEEP-FROZEN LEAF VEGETABLES IN GRANULAR FORM

[75] Inventors: Bengt L. Bengtsson, Bjuv; Sven I. W. Bosund, Halsingborg; Bertil Hylmö, Bjuv, all of Sweden

[73] Assignee: Produits Findus S.A., Vevy Suisse, Switzerland

[21] Appl. No.: 691,696

[22] Filed: Jun. 1, 1976

Related U.S. Application Data

[60] Continuation of Ser. No. 337,257, Mar. 1, 1973, abandoned, which is a division of Ser. No. 66,888, Aug. 25, 1970, Pat. No. 3,734,751.

[30] Foreign Application Priority Data

Aug. 25, 1969 [GB] United Kingdom ............... 42167/69

[51] Int. Cl.$^2$ ................................................ A23B 7/04

[52] U.S. Cl. .................................... 426/615; 426/393
[58] Field of Search ................................ 426/615, 393

[56] References Cited

FOREIGN PATENT DOCUMENTS 936194 9/1963 United Kingdom ..................... 426/615

OTHER PUBLICATIONS

Food and Food Products, vol. II, 2nd ed., Jacobs (ed.), Interscience Pub. Inc., New York, 1951, p. 1346.

Primary Examiner—Jeanette M. Hunter
Attorney, Agent, or Firm—Blum, Kaplan, Friedman

[57] ABSTRACT

Deep-frozen comminuted leaf vegetables such as spinach are provided in particulate form and have a reduced water content.

9 Claims, No Drawings

PREPARATION OF DEEP-FROZEN LEAF VEGETABLES IN GRANULAR FORM

REFERENCE TO RELATED APPLICATION

This is a continuation of application Ser. No. 337,257, filed Mar. 1, 1973, now abandoned, which is a division of our copending application Serial No. 66,888 filed 25th Aug. 1970 now Pat. No. 3,734,751.

This invention is concerned with the treatment of vegetables prior to deep-freezing.

Leaf vegetables, such as spinach, kale, broccoli, Swiss chard, celery, parsley and endive have a low dry matter content, usually not exceeding 10% by weight. When such vegetables are deep-frozen, considerable energy is consumed in freezing the water present, as well as in maintaining the low temperatures required for storage of these products, both in cold stores and in the distribution chain. The major part of the total production of these vegetables is comminuted during processing in the factory and frozen and sold as solid blocks. The frozen blocks, however, require considerable time to thaw prior to cooking at home. Because of their hardness, it is practically impossible for the housewife to accelerate thawing and cooking by first breaking up these blocks into small pieces. It is likewise difficult to break up the frozen blocks to allow the preparation of single portions. Furthermore, owing to the high water content, the use of chopped vegetables in various recipes in home cooking is limited.

In accordance with the present invention, the disadvantages outlined above are largely overcome by reducing the water content of the vegetables and shaping the product into individual pieces prior to freezing.

The process of the present invention for preparing deep-frozen comminuted leaf vegetables accordingly comprises comminuting the vegetables, optionally after precooking or blanching, increasing the dry matter content of the comminuted vegetables by partial dewatering, shaping the partially dewatered vegetables into particulate form and deep-freezing the particles.

The invention also provides a deep-frozen comminuted vegetable such as spinach in particulate form and having a reduced water content. By "particulate form" we mean pieces or granules which may for example be from about 2 to 40 mm in size. The preparation of such pieces is described hereinafter.

In carrying out the process according to the present invention, the fresh vegetables may first be washed, blanched and chopped or otherwise comminuted. These operations are carried out by the conventional methods of the frozen food industry.

The comminuted vegetables are then partially dewatered, for example by pressing or centrifugation, to a dry matter content of about 9-15% by weight. Centrifugation, using a desludging centrifuge is preferred, and this operation yields two streams. The first is the product, containing about 9-15% by weight of dry matter, and a clear effluent containing less than about 3% solids. The effluent stream is either discarded or it may be concentrated, for example by evaporation, reverse osmosis or freeze-concentration, to a dry matter content approximating to or higher than that of the product stream. The concentrated effluent may then be combined with the product stream. Prior to concentration the effluent may be purified, for example by treatment with anion exchange resins or active carbon or by electrodialysis. The purification step removes from the effluent certain undesirable anions, such as nitrite and oxalate, as well as various unidentified coloured substances and bitter-tasting materials. When ion-exchange is used for purification, it is preferred to exchange the anions present in the effluent against chloride ions.

The product stream, optionally with concentrated effluent added, is sent to a shaping machine such as an extruder, meat-ball former or the like, where the comminuted vegetables are formed into discrete pieces. These pieces may have a maximum dimension of 2 to 40 mm, and be of different shapes depending on the dies or moulds used. If desired, a thickening agent such as a starch may be added to the product before the shaping operation to produce a variant of the product similar to creamed spinach. The amount of the thickening agent can be varied within wide limits, for example from 0.1 to 2.0 parts by weight per part of dry matter present. Wheat starch, as well as various commercially available modified starches are very suitable for use as thickening agents. The addition of a thickening agent, even in small amounts, facilitates shaping of the comminuted vegetable. Various seasonings, such as salt, pepper, spices, monosodium glutamate and vegetable protein hydrolysates may also be incorporated in the vegetables prior to shaping.

The shaped pieces are then deep-frozen, for example in a blast freezer or a fluidised bed freezer. In both cases freezing preferably takes place in two steps, the first being surface freezing of the pieces. The surface freezing may also be effected outside the freezer, but irrespective of the method used, it should desirably be rapid so that the pieces retain their shape. The pieces are then deep-frozen and packaged and stored in the usual manner.

Deep-frozen, comminuted vegetables, especially spinach and kale, prepared according to the invention are available to the consumer in free-flowing, concentrated form which has several advantages as compared to conventional blocks. Thus, the thawing and cooking time is considerably reduced as the particles are added to an appropriate volume of hot water rather than being heated "dry".

Furthermore, a single consumer-sized package of the particulate vegetable may easily be subdivided by the housewife into single servings, so that it need not all be thawed.

The following Examples, in which all parts and percentages are by weight, are given only for the purpose of illustrating the invention.

EXAMPLE 1

Spinach containing about 7% solids is washed in cold water, blanched with stream, and chopped to an average particle size of 5 mm.

100 parts of the chopped spinach are fed into a desludging centrifuge from which two streams are withdrawn. The product stream (50 parts) have a solids content of 11.5% whereas the effluent stream (50 parts) contains about 2.5% solids.

The effluent stream is concentrated by evaporation under reduced pressure to a solids content of 40%. The concentrated effluent is combined with the product stream. The concentrated spinach is then fed to an extruder which produces pieces about 20 mm in size. These pieces are then frozen in a flow-freezer where they are first surface frozen rapidly by a blast of cold air and then brought down to a temperature of −30° C.

The free-flowing pieces are then packaged and stored at −30° C. in the usual manner.

To prepare the spinach for consumption, 100 g of the frozen pieces are added to 100 g of hot water and cooked for two minutes.

EXAMPLE 2

The procedure described in Example 1 is repeated except that, prior to concentration, the centrifuge effluent is passed through a bed of anion exchange resin. The product has very good flavour, lacking in bitterness.

EXAMPLE 3

The procedure described in Example 1 is repeated except that, prior to extrusion, 1 part of modified starch per part of dry matter is added to the product stream, together with salt, pepper and seasonings. An excellent prepared spinach is obtained.

We claim:

1. A leaf vegetable product comprising a plurality of separate, free-flowing, deep frozen granules, each granule being formed from a comminuted and partially dewatered leaf vegetable.

2. A product according to claim 1, in which the vegetable is spinach.

3. A product according to claim 1, having a dry matter content of 9 to 15% by weight.

4. A product according to claim 1, comprising at least one of an added thickening agent and an added flavoring agent, said added thickening agent when present being present in an amount effective for facilitating shaping said comminuted leaf vegetable into granules.

5. A product according to claim 1, in which the vegetable is spinach and the product has a dry matter content of about 9 to 15% by weight.

6. A product according to claim 5, comprising free-flowing granules having a maximum dimension of 2 to 40 mm.

7. A product according to claim 5, comprising at least one of an added thickening agent and an added flavoring agent, said added thickening agent when present being present in an amount effective for facilitating shaping said comminuted leaf vegetable into granules.

8. A deep-frozen comminuted leaf vegetable product, having a water content sufficiently lower than the normal water content of the original vegetable prior to comminution to facilitate shaping into granules and being in free-flowing granular form.

9. A product according to claim 1, comprising granules having a maximum dimension of 2 to 40 mm.

* * * * *